United States Patent
Centofante (10) Patent No.: US 11,644,140 B2
(45) Date of Patent: May 9, 2023

(54) FLOW DAMPENER IN FLOW MEASUREMENT SYSTEM

(71) Applicant: Malema Engineering Corporation, Boca Raton, FL (US)

(72) Inventor: Charles A. Centofante, Los Altos, CA (US)

(73) Assignee: PIRANHA PLASTICS, LLC, Santa Clara, CA (US)

( * ) Notice: Subject to any disclaimer, the term of this patent is extended or adjusted under 35 U.S.C. 154(b) by 183 days.

(21) Appl. No.: 16/994,611

(22) Filed: Aug. 16, 2020

(65) Prior Publication Data

US 2022/0049810 A1 Feb. 17, 2022

(51) Int. Cl.
*F16L 55/053* (2006.01)
*G01F 1/84* (2006.01)

(52) U.S. Cl.
CPC .......... *F16L 55/053* (2013.01); *G01F 1/8418* (2013.01)

(58) Field of Classification Search
CPC ............. F16L 55/04–043; F16L 55/027; F16L 55/02736; F16L 55/053; G01N 1/84; G01F 1/84
See application file for complete search history.

(56) References Cited

U.S. PATENT DOCUMENTS

| | | | |
|---|---|---|---|
| 4,295,492 A | 10/1981 | Zahid | |
| 4,996,963 A | 3/1991 | Fehrenbach et al. | |
| 8,366,421 B2 * | 2/2013 | Munakata | F02M 59/367 417/540 |
| 10,364,783 B2 | 7/2019 | Hwang | |
| 2015/0013814 A1 | 1/2015 | Preston et al. | |
| 2020/0141396 A1 * | 5/2020 | Exler | F04B 15/02 |
| 2020/0159112 A1 | 5/2020 | Shackleton et al. | |

FOREIGN PATENT DOCUMENTS

WO  WO 2018/125757 A1  7/2018

OTHER PUBLICATIONS

PCT International Search Report and Written Opinion, PCT Application No. PCT/US2021/044391, dated Dec. 1, 2021, 13 pages.

* cited by examiner

*Primary Examiner* — Erika J. Villaluna
(74) *Attorney, Agent, or Firm* — Fish & Richardson P.C.

(57) ABSTRACT

A flow dampener for dampening pulsation in a fluid flow includes a body shell, a flexible membrane, and two flow ports. The body shell has an interior surface and an elongate groove formed on the interior surface. The flexible membrane is sealed to the interior surface of the body shell and covers the elongate groove. In some embodiments, the flexible membrane is over-molded onto the body shell. The flexible membrane cooperates with the elongate groove to form an elongate flow path for the fluid flow. The flexible membrane has a thickness in a range from 0.5 mm to 6 mm. As the membrane is flexible, it vibrates as the fluid flows through the elongate flow path, absorbs kinetic energy in the fluid flow, and thereby dampens pulsation in the fluid flow.

17 Claims, 8 Drawing Sheets

FLOW DAMPENER IN FLOW MEASUREMENT SYSTEM

BACKGROUND

Field of the Disclosure

The present disclosure generally relates to flow dampeners, and specifically to flow dampeners that dampen fluid pulsation through a flexible membrane sealed on a body shell.

Description of the Related Arts

A flow process skid usually includes devices (such as pumps) that can cause pulsation in fluid flow. The pulsation in the fluid flow results in excess movement of the fluid and may interfere with the operation of other devices in the process skid. For example, the excess movement can damage pipe joints and supports. It can also cause inaccuracy in flow rate measurement.

Currently available pulsation dampeners are typically made of metals and, therefore, they are usually heavy and expensive. Such dampeners are not suitable for single use or disposable applications. They are also not suitable for applications that have high requirements for sterilization. Sterilization of metal parts is typically done through chemicals. Such sterilization can be challenging and not effective for use in certain process skids, such as biopharmaceutical or pharmaceutical process skids. Also, the currently available dampeners fail to provide sufficient dampening for accurate measurement of low flow rates. Thus, improved technologies for dampening pulsation are needed.

SUMMARY

Embodiments relate to a flow dampener that dampens pulsation in a flow of fluid. In some embodiments, the flow dampener includes two halves, two external flow ports, and a through flow port. Each half includes a body shell and a flexible membrane. The body shell has an interior surface, on which an elongate groove is formed. The elongate groove may have a circular shape or in other shapes. The flexible membrane is sealed onto the interior surface of the body shell, e.g., through over-molding, and covers the elongate groove. An elongate flow path is formed by the elongate groove and the flexible membrane. The flexibility of the flexible membrane dampens vibration in the flow. As the flow goes through the elongate flow path, the flexible membrane vibrates with the flow and absorbs kinetic energy in the flow. The elongate flow path in each half has two ends. One end of the elongate flow path in each half is connected to one of the two external flow ports. The other ends of the two elongate flow paths are connected to each other via the through flow port.

In some embodiments, the flow dampener includes one body shell, one flexible membrane, and two flow ports. The body shell and the flexible membrane form an elongate flow path. Each of the two flow ports connects to one end of the elongate flow path.

Some or all of the components of the flow dampener can be made of polymer materials. Thus, the flow dampener has low cost, making it suitable for single use/disposable applications. Also, it can be sterilized by using Gamma irradiation, which is more effective than chemical sterilization.

The flow dampener may be used in a flow measurement system that includes a pump and a Coriolis flow sensor. The flow dampener is arranged between the pump and the Coriolis flow sensor. The flow dampener reduces pulsation in fluid flow caused by the pump before the fluid enters the Coriolis flow sensor to improve measurement accuracy of the Coriolis flow sensor. In some embodiments, another flow dampener is used at the inlet side of the pump so that the fluid flows into the pump from one flow dampener, exits the pump into the other flow dampener and then into the Coriolis flow sensor. With two flow dampeners arranged on the inlet and outlet sides of the pump, better dampening can be achieved.

BRIEF DESCRIPTION OF THE DRAWINGS

The teachings of the embodiments can be readily understood by considering the following detailed description in conjunction with the accompanying drawings.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments relate to a flow dampener including one or more body shells and one or more flexible membranes. Each flexible membrane is sealed to a body shell formed with an elongate groove. The flexible membrane and the elongate groove form an elongate flow path with an elongate groove formed on the interior surface of the body shell. As a fluid flows through the elongate flow path, the flexibility of the flexible membrane dampens vibration in the fluid flow. The body shells and flexible membranes can be made of polymer materials. The flow dampener can be coupled with a Coriolis flow sensor to improve accuracy in flow rate measurement by the Coriolis flow sensor.

Such a flow dampener has advantages for single use/disposable applications, e.g., bioprocessing, biopharmaceutical applications, and pharmaceutical applications. First, the flow dampener has lower cost than conventional flow dampeners since it can be made of polymer materials instead of metals, which makes the flow dampener more economical for single use applications. Second, the use of the flexible membrane makes the flow dampener more efficient so that it can achieve the same or even better dampening effect even with a smaller size. As the flow dampener is lighter and smaller than conventional flow dampeners, it is easier for a user to carry and replace the flow dampener after each process. Third, the flow dampener provides effective dampening for fluid flows at low flow rates (such as 0.05 g/min to 5 g/min) so that it can improve measurement accuracy of the Coriolis flow sensor at low flow rates. Fourth, the flow dampener can be sterilized by using Gamma sterilization. In some embodiments, the flow dampener is compliant for Class VI Gamma sterilization up to 50 kGy. Conventional flow dampeners cannot be sterilized with Gamma irradiation because their metal components can block the Gamma irradiation and create shadows. Metal parts in a process skid are typically sterilized by using chemicals, which is not as effective as Gamma radiation.

Figure 1:
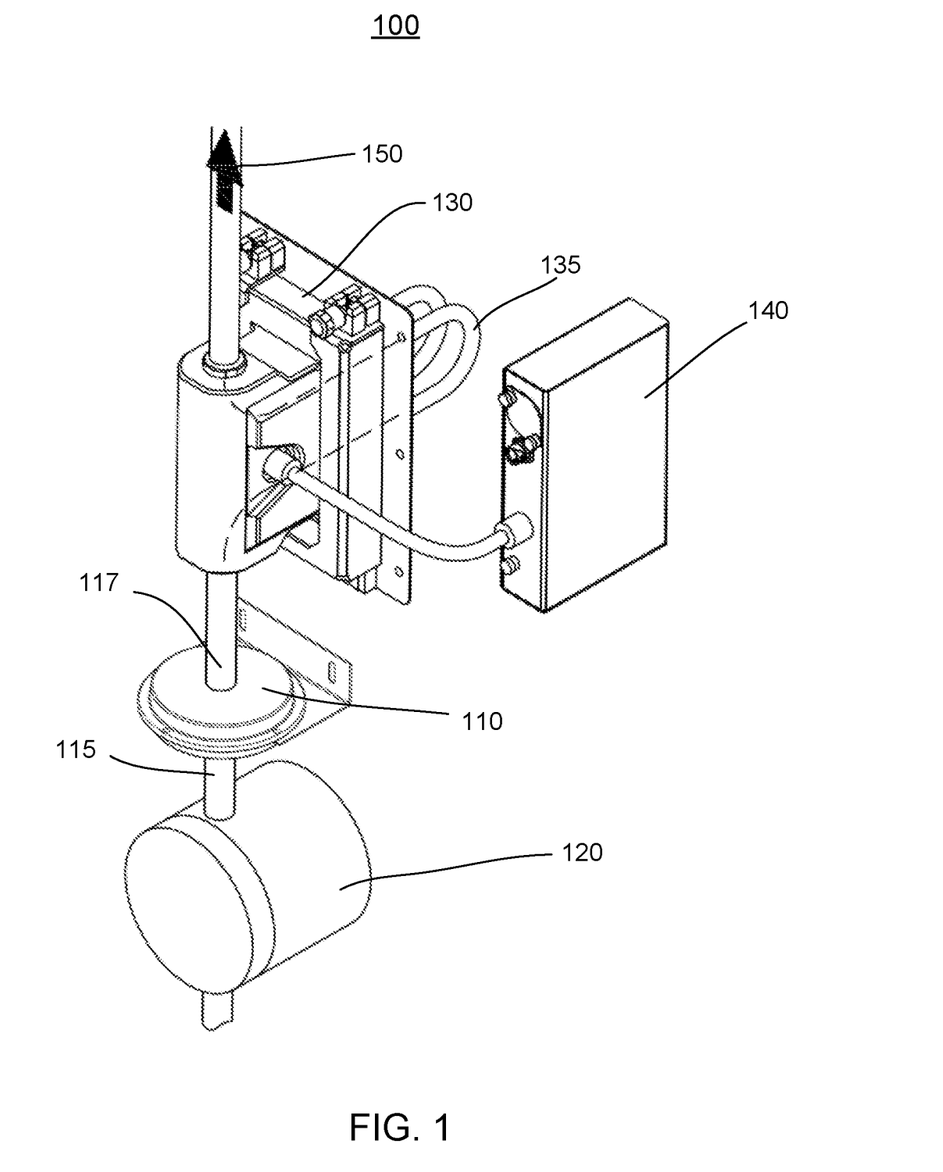
FIG. 1 is a perspective view of a flow measurement system including a flow dampener, in accordance with an embodiment.

FIG. 1 is a perspective view of a flow measurement system 100 including a flow dampener 120, in accordance with an embodiment. The flow measurement system 100 also includes a pump 110, a Coriolis flow sensor 130, a controller 140, and tubing connecting the pump 110, flow dampener 120, and Coriolis flow sensor 130. In other embodiments, the flow measurement system 100 may include additional, fewer, or different components. For instance, the flow measurement system 100 can include more flow dampeners, flow sensors, or pumps. The flow measurement system 100 can be a part of a process skid, e.g., a biopharmaceutical or pharmaceutical skid.

The pump 110 pumps a fluid into the flow dampener 120. In some embodiments, the pump 110 is a diaphragm based pulsating pump, such as peristaltic pumps, gear pumps, membrane pumps, or any type of Diaphragm based pulsating pump. The pulsating operation of the pump 110 causes pulsation in the flow of the fluid, which can result in damage to the flow measurement system 100. The damage may include physical damage to components of the flow measurement system 100 as well as interference with operation of other devices (e.g., Coriolis flow sensor 130) in the flow measurement system 100 that cause inaccuracy or malfunction of these devices. For instance, the pump 110 may operate at a frequency that is similar to or the same as the resonant frequency of the Coriolis flow sensor 130, causing inaccurate measurement. Such interference is referred to as destructive harmonic interference.

The flow dampener 120 dampens pulsation in the fluid flow and thereby reduces damage caused by the pump 110 to the flow measurement system 100, such as the destructive harmonic interference from the pump 110 on the Coriolis flow sensor 130. The flow dampener 120 includes a body shell and a membrane that is flexible. An elongate groove is formed on a surface of the body shell. The membrane is sealed to the surface where the elongate groove is formed, forming an elongate channel (referred to as an "elongate flow path") through which the fluid can flow. The membrane may be sealed to the surface through over-molding, mechanical fastening, adhesive attachment, etc. The elongate groove may have other shapes, such as zig-zag, oval, circle, square, rectangular, etc. When the fluid flows through the elongate flow path, the flexibility of the membrane dampens the vibration in the fluid flow. As the membrane is flexible, the pulsation in the fluid flow drives the membrane to vibrate. The vibration of the membrane absorbs the kinetic energy in the fluid flow, e.g. by transferring the kinetic energy into heat, and therefore, reduces vibration in the fluid flow.

In some embodiments, one body shell and corresponding membrane constitute one half of the flow dampener 120. The other half of the flow dampener 120 includes another body shell and membrane, which forms another elongate flow path. With this additional pair of the body shell and membrane, the total flow path provided by the flow dampener 120 is doubled and the dampening effect is enhanced. The flow dampener 120 may have more pairs of the dampener and membrane to further enhance the dampening effect.

In some embodiments, the flow dampener 120 can remove at least 95% of the pulsation of the fluid flow. With the flow dampener 120, the accuracy of flow rate measurement by the Coriolis flow sensor 130 can be approximately +/−1%, even at low flow rates such as 0.05 g/min to 5 g/min.

In FIG. 1, the flow dampener 120 is arranged at the outlet side of the pump 110. The flow dampener 110 includes two external flow ports—an inlet flow port 125 and an outlet low port 127. The inlet flow port 125 is connected to one end of the flow path through the flow dampener 120 and also connected to the flow path provided by the pump 110, to allow the fluid to flow from the pump 110 to the flow dampener 120. The outlet flow port 117 is connected to the other end of the flow path through the flow dampener 120 and to the flow path to the Coriolis flow sensor 130, to allow the fluid to exit the flow dampener 120 and enter the Coriolis flow sensor 130.

In some embodiments, the flow measurement system includes a second flow dampener arrange at the inlet side of the pump 110. The outlet flow port of the second flow dampener is connected to the flow path in the pump 110 so that the fluid flows from the second flow dampener to the pump 110 and then to the flow dampener 120. The second flow dampener dampens pulsation in the fluid before it enters the pump 110.

The Coriolis flow sensor 130 measures flow characteristics (e.g., mass flow rate, volumetric flow rate, flow density, etc.) of the fluid. The Coriolis flow sensor 130 can measure flow rate in various ranges, such as 0.05 g/min to 5 g/min, 0.25 g/min to 50 g/min, 15 g/min to 3 kg/min, 90 g/min to 20 kg/min, 1 kg/min to 250 kg/min, or some combination thereof. In some embodiments, the Coriolis flow sensor 130 includes one or two flow tubes 135 that provide a flow path. A flow tube 135 may be made from a material selected from a group consisting of stainless steel, Polyetheretherketone (PEEK), Perfluoroalkoxy alkanes (PFAs), Polyvinylidene difluoride (PVDF), Polytetrafluoroethylene (PTFE), and Fluorinated ethylene propylene (FEP). The flow tubes can vibrate, e.g., as driven by magnets and coils. As the fluid flows through the flow tubes 135, Coriolis forces produce a twisting vibration of the flow tubes, resulting in a phase shift of the vibration of the flow tubes 135. The fluid changes the resonant frequency of the flow tubes 135. The Coriolis flow sensor 130 generates signals, e.g., electrical signals, that represent the phase shift and/or change in its resonant frequency. The signals are sent to the controller 140 through an interface connector on the Coriolis flow sensor 130. In the embodiment of FIG. 1, the Coriolis flow sensor 130 include U-shaped flow tubes 135. Flow sensors in other embodiments can include flow tubes of other forms, such as V-shaped.

In some embodiments, the Coriolis flow sensor 130 also includes a memory chip (not shown in FIG. 1) that stores calibration information that can be used to adjust flow measurements made by the Coriolis flow sensor 130. For instance, the calibration information can include one or more flow rate calibration factors. Each flow rate calibration factor indicates a difference between a flow rate measured by the Coriolis flow sensor 130 and a reference flow rate and can be used to adjust flow rates measured by the Coriolis flow sensor 130. The calibration information can also include one or more flow density calibration factors. Each flow density calibration factor indicates a difference between a flow density measured by the Coriolis flow sensor 130 and a reference flow density and can be used to adjust flow densities measured by the Coriolis flow sensor 130. The calibration information can be determined during manufacturing.

The Coriolis flow sensor 130 can include a temperature probe (not shown in FIG. 1) that measures temperatures of the fluid. The measured temperatures can be used to adjust flow rates and/or densities measured by the Coriolis flow sensor 130.

The controller 140 receives signals from the Coriolis flow sensor 130 and conducts flow analysis based on the signals. The flow analysis includes, for example, determination of flow rate based on signals representing phase shift of the flow tube, determination of flow density based on signals representing change in resonant frequency of the flow tube, detection of bubbles in the fluid based on change in flow density, determination of other flow characteristics of the fluid, or some combination thereof.

The controller 140 can read out the calibration information from the memory chip of the Coriolis flow sensor 130 and use the calibration information in its flow analysis. For example, the controller uses a flow rate calibration factor to determine a flow rate of the fluid or uses a flow density calibration factor to determine a density of the fluid. The controller 140 can also receive temperature information from the temperature probe and use the temperature information to dynamically adjust the flow analysis. For instance, the controller can input the temperature information into a model and the model can output adjusted flow rate and/or flow density.

In some embodiments, the controller is a flow transmitter. In FIG. 1, each flow sensor is connected to a respective controller for flow analysis. The Coriolis flow sensor 130, cradle (usually made of stainless steel) of the flow sensor, and the controller 140 together can be referred to as a flow meter or a flow meter system.

In the flow measurement system 100 of FIG. 1, the pump 110, the flow dampener 120, and the Coriolis flow sensor 130 are arranged vertically and the fluid flows from the bottom to the top as indicated by the arrow 150. The flow measurement system may have different designs, where, for example, the pump 110 is arranged on top of the flow dampener 120, which is on top of the Coriolis flow sensor 130. As another example, any two of the three components can be arranged side-to-side. In some embodiments, the flow dampener 120 is oriented that its inlet flow port is on the top and its outlet flow port is on the bottom to facilitate drainage of the fluid.

Figure 2A:
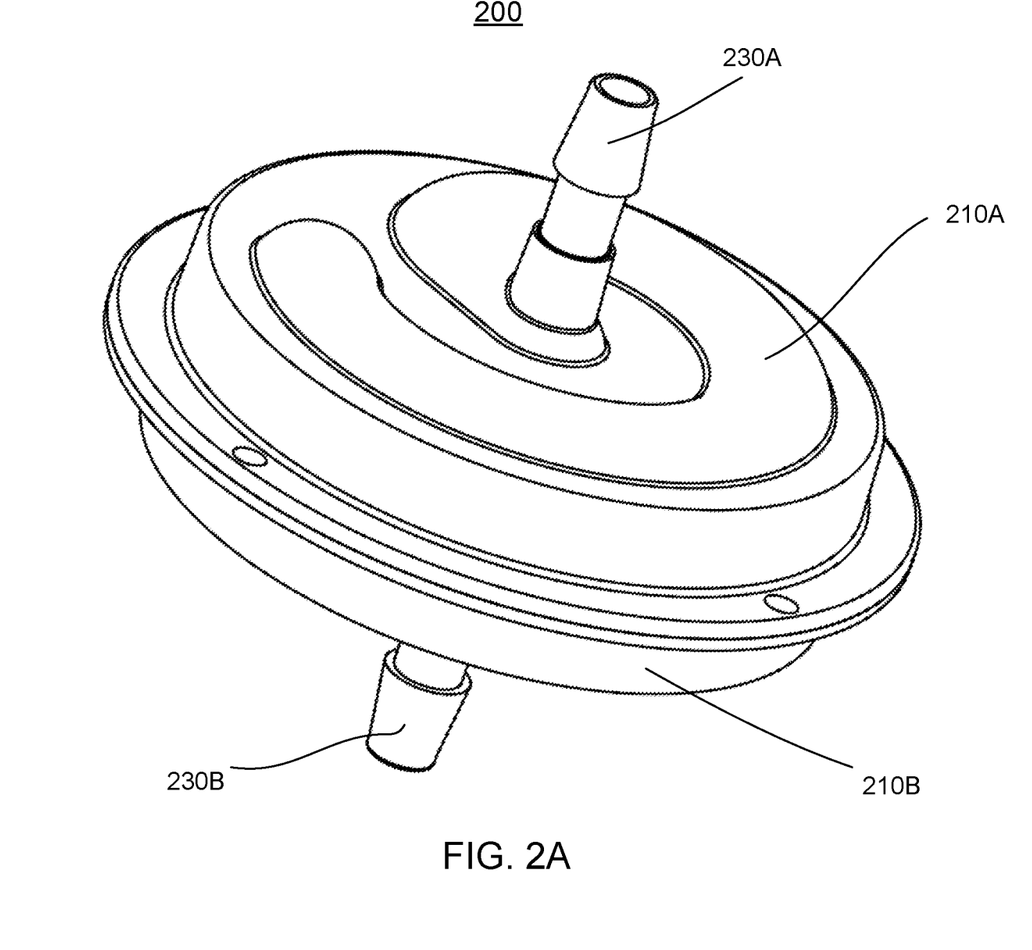
FIG. 2A is a perspective view of a flow dampener, in accordance with an embodiment.
Figure 2B:
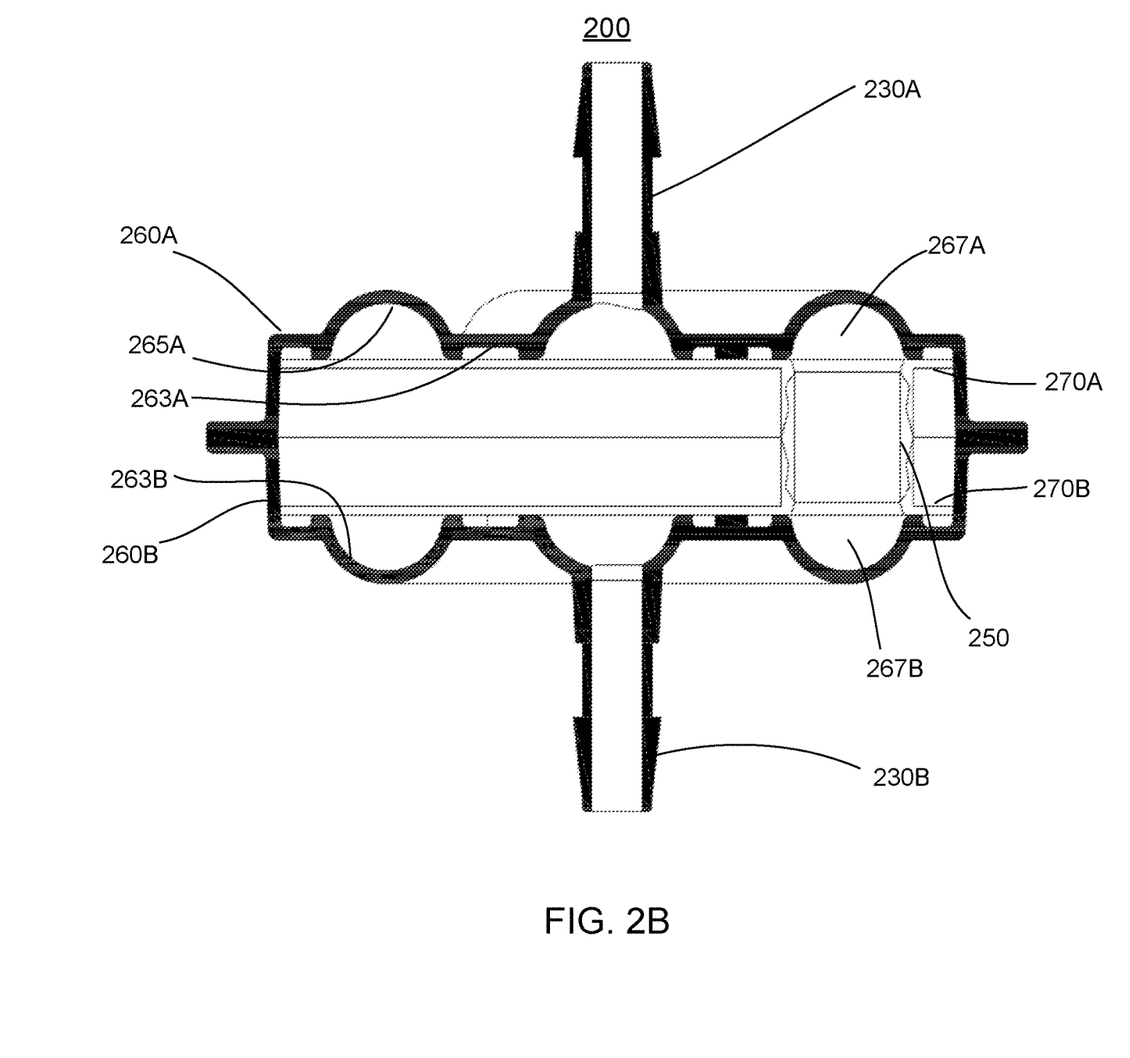
FIG. 2B is a cross-sectional view of the flow dampener, in accordance with an embodiment.
Figure 2C:
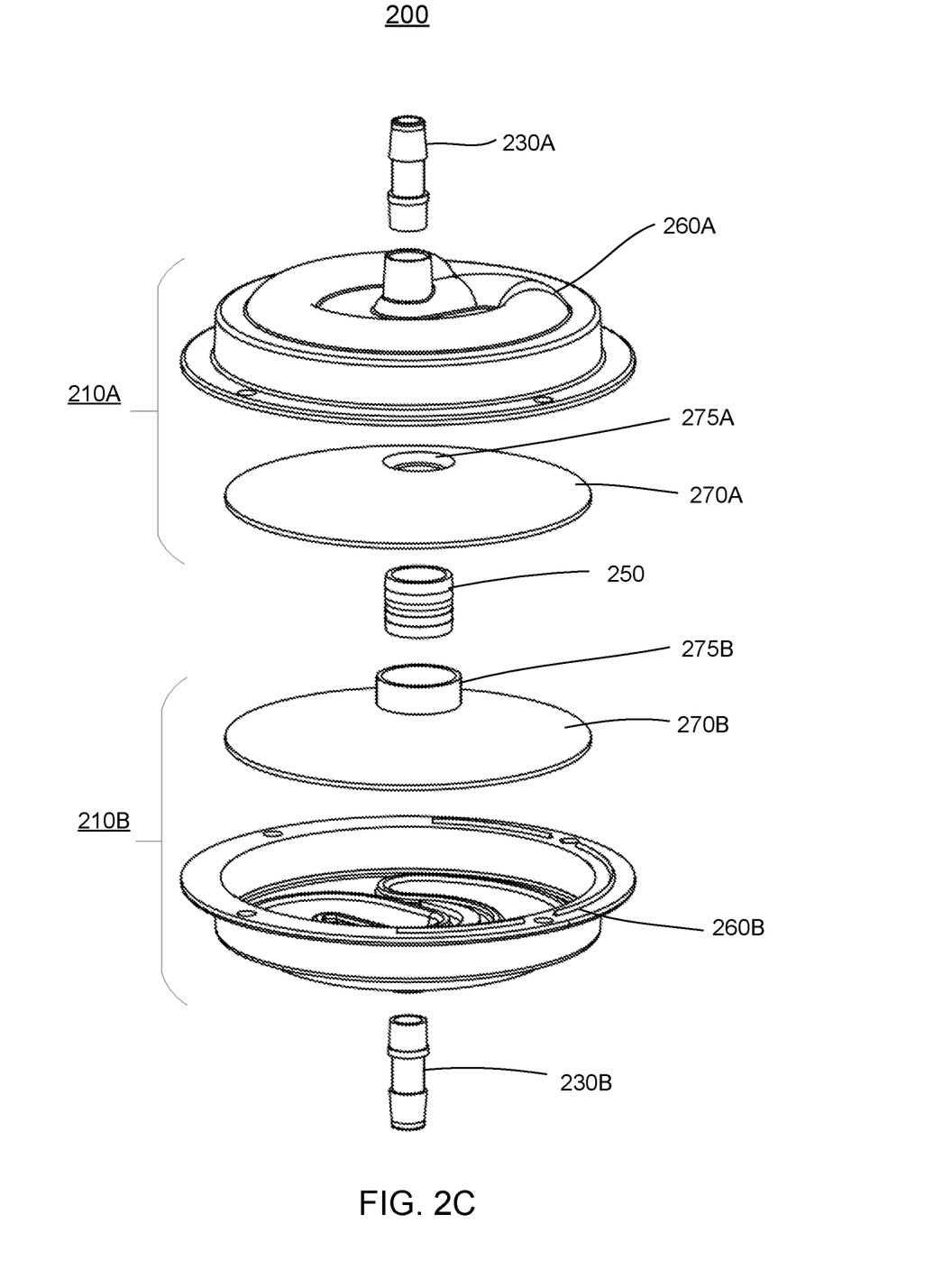
FIG. 2C is an exploded view of the flow dampener, in accordance with an embodiment.

FIGS. 2A-2C show a flow dampener 200. FIG. 2A is a perspective view of the flow dampener 200, in accordance with an embodiment. FIG. 2B is a cross-sectional view of the flow dampener 200, in accordance with an embodiment. FIG. 2C is an exploded view of the flow dampener 200, in accordance with an embodiment. The flow dampener 200 is an embodiment of the flow dampener 120 in FIG. 1. The flow dampener 200 includes two sections (also referred to as halves in the embodiment of FIGS. 2A-2C) 210A and 210B, two external flow ports 230 (collectively referred to as "external flow ports 230"), and a through flow port 250.

One half 210A includes a body shell 260A and a flexible membrane 270A. The body shell 260A has an interior surface 263A, which may be flat, and an elongate groove 265A formed on the interior surface 263A. The body shell 260A may be made of a polymer material or a metal. The polymer material can be a rigid thermoplastic material (such as acrylonitrile butadiene styrene (ABS), polycarbonate, Nylons, acetate, thermoplastic polyurethane (TPU) and polyvinyl chloride (PVC), PTFE, modified PTFE (TFM), perfluoroalkoxy alkanes (PFA), etc.) or a rigid thermoset material (such as epoxy, phenolic, silicone, etc.). The metal can be, e.g., cast iron, carbon steel, stainless steel, aluminum, titanium, zirconium, etc. In some embodiments, the body shell 260A is formed through injecting modeling, compression molding, transfer molding, castings, or machining. The body shell 260A may have a round shape or other shapes, such as rectangular, oval, square, etc. The body shell 260A can have various sizes. In some embodiments, the diameter of the body shell 260A is in a range from 0.5 to 36 inches. The elongate groove 265A can be of various shapes, such as rectangular spiral, racetrack, zig-zag, circular spiral, rectangular, serpentine, semicircular, square, oblong, or other geometric shapes. In some embodiments where the elongate groove 265A has a circular shape, its radius is approximately ⅛ inch or larger. In some embodiments where the elongate groove 265A has a square shape, each side of the square is approximately ⅛ inch or larger. In some embodiments, the groove 265A has a width up to two inches and/or a length in a range from one inch to four feet. In some embodiments, the depth of the elongate groove 265A is determined based on the level of dampening that is needed. For instance, the elongate groove 265A is deeper for more dampening.

The flexible membrane 270A is sealed to the interior surface 263A and covers the elongate groove 265A. In some embodiments, the flexible membrane 270A is over-molded onto the interior surface 263A. In some other embodiments, the flexible membrane 270A is bonded to the interior surface 263A through adhesives (e.g., a glue), mechanical fastening, or other methods. The flexible membrane 270A cooperates with the elongate groove 265A to form an elongate flow path 267A. The elongate flow path 267A has two ends: one is located near or at the center of the body shell 260A (referred to as center end) and the other end is located near the edge of the body shell 260A (referred to as edge end). In some other embodiments, the ends of the elongate flow path 267A can be at different locations. The elongate flow path 267A has a shape that is defined by the shape of the elongate groove. The elongate flow path may have a circular shape or other shapes, e.g., those shown in FIG. 4.

Flexibility of the flexible membrane 270A dampens vibration in a flow of fluid through the elongate flow path. In some embodiments, the durometer Shore A scale hardness of the flexible membrane 270A is in a range from 45A to 90A. For certain applications, the durometer of the flexible membrane 270A is approximately 70A. The thickness of the flexible membrane 270A is in a range from 0.5 mm to 12 mm. In some embodiments, the thickness of the flexible membrane 270A is determined based on the pressure rating of a pump that the flow dampener 200 is attached to for dampening pulsation in the flow caused by the pump. The flexible membrane 270A may be made from flexible thermoplastic or flexible thermoset materials, such as thermoplastic polyurethane (TPU), thermoplastic elastomers (TPE), polyvinyl chloride (PVC), polytetrafluoroethylene (PTFE), modified PTFE, perfluoroalkoxy alkanes, or silicone. The flexible membrane 270A can be made by injection molding, compression molding, transfer molding, casting, or machining. The flexible membrane 270A includes a port 275A at a location corresponding to the edge end of the elongate flow path 267A. The port includes a hole through the flexible membrane 270A to facilitate flow of the fluid to the other half 210B of the flow dampener.

The other half 210B has a similar design and also includes a body shell 260B and a flexible membrane 270B. The body shell 260B may be similar to or the same as the body shell 260A. The two body shells 260A and 260B are fastened to each other, e.g., by bolts. The flexible membrane 270B may be similar to or the same as the flexible membrane 270A. In some embodiments, the flexible membrane 270B has a different softness from the flexible membrane 270A. For instance, the flexible membrane 270B is softer than the flexible membrane 270A. This design allows a larger range of frequencies to be dampened, compared with a design in which the two flexible membranes 270 have the same or similar softness. The flexible membrane 270B has a port 275B including a hole at a location corresponding to the edge end of the elongate flow path 267B. The body shell 260B and flexible membrane 270B form another elongate flow path 267B. The elongate flow path 267B may be counter-rotational to the elongate flow path 267A. More details about elongate flow paths are described below in conjunction with FIG. 3.

The through flow port 250 provides a flow path between the edge ends of the elongate flow paths 267A and 267B. The through flow port 250 can be connected to the ports 275A and 275B of the flexible membranes 270A and 270B. In the embodiment of FIGS. 2A-2C, the through flow port is in a shape of a tube. It can be connected to a port formed on each of the flexible membranes 267A and 267B, e.g., by adhesives or thread. In some other embodiments, a through flow port is integrated with the flexible membranes 267A and 267B. The through flow port includes the hole through each of the flexible membranes 270A and 270B and a tubing providing a channel between the holes. The elongate flow paths 267A and 267B may have different directions.

The two external flow ports 230 are connected to the elongate flow paths 267A and 267B to allow the fluid to enter and exit the flow dampener 200. For example, the external flow port 230A is connected to the center end of the elongate flow path 267A and the external flow port 230B is connected to the center end of the elongate flow path 267B. In other embodiments, each of the external flow ports 230 may be connected to the edge end of the elongate flow paths 267A and 267B. In some embodiments, the two external flow ports 230 are identical. In other embodiments, they are different to accommodate different types or sizes of tubing connected to the flow dampener 200.

Each of the two external flow ports 230 comprises a hole through the corresponding body shell 260A, 260B. The external flow ports 230 may support various connections to tubing (either soft or rigid), such as threaded connection, tapered connection, connection through O-ring. A barbed tubing adapter can be mounted onto an external flow port 230 to connect the external flow port 230 to a tubing. More details about barbed tubing adapter are described below in conjunction with FIG. 6. In some embodiments, push-in fittings are used to connect the external flow ports 230 to tubing.

The external flow ports 230 are mounted on opposite sides of the flow dampener 200. One of the two external flow ports 230 functions as an inlet flow port, and the other one functions as an outlet flow port. For example, one of the external flow ports 230 is mounted on the body shell 260A and the other one is mounted on the body shell 260B. In some embodiment, the flow paths through the external flow ports 230 are collinear. In some other embodiments, the flow paths are at right angles.

The flow dampener 200 may be orientated vertically in a flow measurement system, meaning one of the external flow ports 230 (e.g., the one functioning as the inlet flow port) is on the top of the flow dampener 200 and the other one (the one functioning as the outlet flow port) is on the bottom of the flow dampener 200. Such an orientation facilitates drainage of the fluid under the force of gravity. With such an orientation, self-draining can be sufficient. In some embodiments, the fluid does not contact any metal as it flows in the flow dampener 200. In some embodiments, the flow dampener 200 is disposable after single use.

Figure 3:
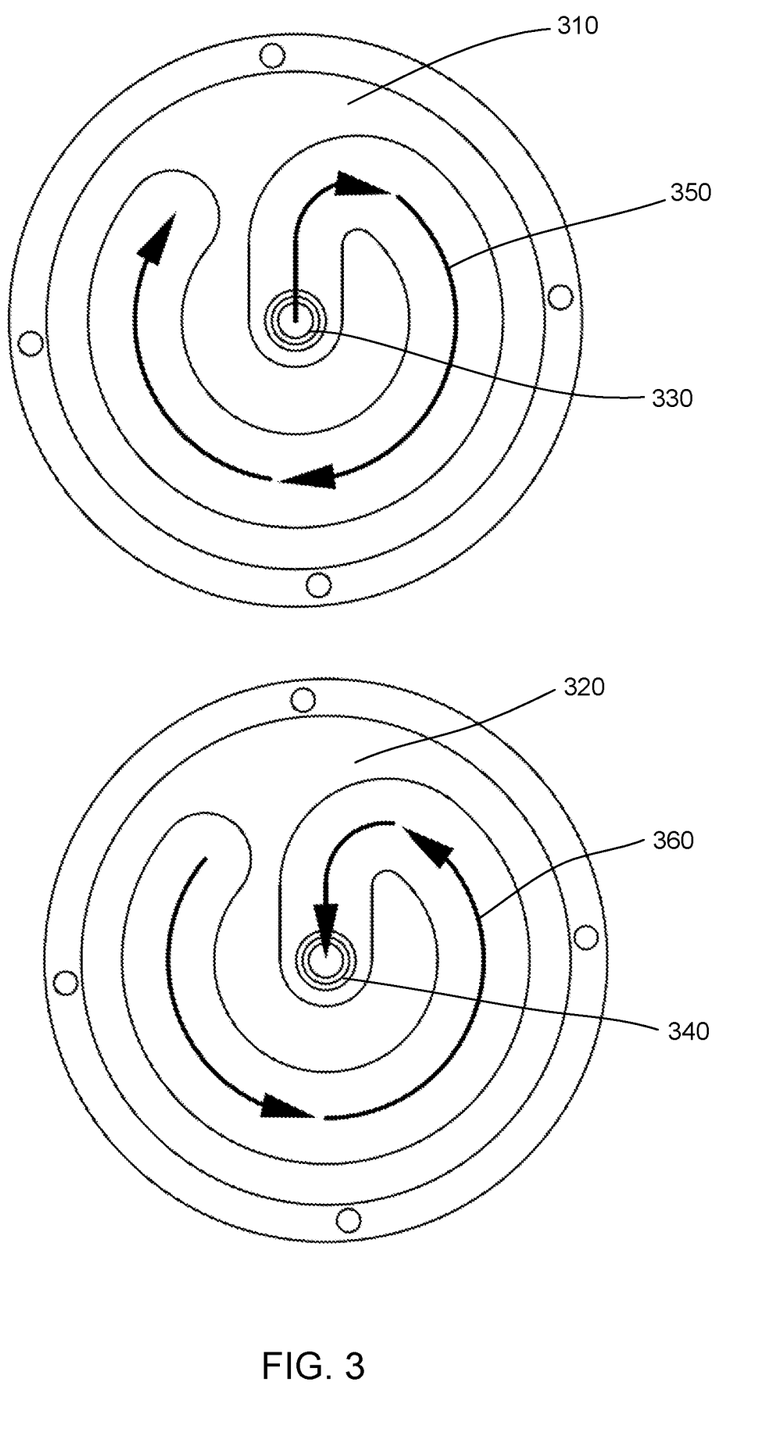
FIG. 3 illustrates counter-rotational elongate flow paths in the flow dampener, in accordance with an embodiment.

FIG. 3 illustrates counter-rotational elongate flow paths 350 and 360 in the flow dampener 200, in accordance with an embodiment. FIG. 3 shows planar cross-sectional views of two body shells 310 and 320 of the flow dampener. In some embodiments, the flow dampener is oriented vertically during operation and the body shell 310 is on top of the body shell 320. Both views in FIG. 3 are looking down at the body shells 310, 320. A flow port 330 is mounted on the body shell 310 and provides an inlet flow path. The flow port 330 includes a hole through the center of the body shell 310. A flow port 340 includes a hole going through the center of the body shell 320. The flow port 340 provides an outlet flow path. Given such a design, the fluid enters the top of the flow dampener through the center of the body shell 310 and exits the bottom of the flow dampener through the center of the body shell 320. As indicated in the arrows in FIG. 3, the body shell 310 and its corresponding flexible membrane (not shown in FIG. 3) provides a clockwise elongate flow path 350, while the body shell 320 and its corresponding flexible membrane (not shown in FIG. 3) provide a counter-clockwise elongate flow path 360. In other words, the two elongate flow paths 350 and 360 are counter-rotational.

Figure 4:
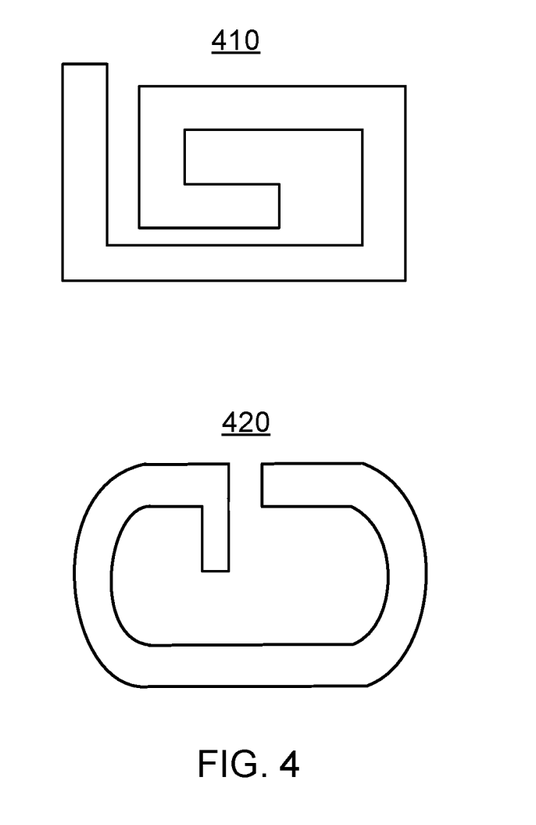
FIG. 4 illustrates elongate flow paths of different shapes, in accordance with various embodiments.

FIG. 4 illustrates elongate flow paths 410 and 420 of different shapes, in accordance with an embodiment. FIG. 4 includes two elongate flow paths 410 and 420 that have different shapes from the spiral flow paths in FIGS. 2 and 3. The elongate flow path 410 has a rectangular spiral shape. The elongate flow path 430 has a racetrack shape. Even though not shown in FIG. 4, elongate flow paths can have other shapes, such as zig-zag, circular spiral, rectangular, serpentine, etc. In some embodiments, some of the shapes are favored. For instance, in some embodiments, the elongate flow paths 420 may be favored over the elongate flow path 410 as the elongate flow path 410 has corners. The fluid flow can cause pressure at the corners (e.g., water hammer), and substances in the fluid (e.g., organic cells) can build up at the corners. In some other embodiments, the elongate flow path 410 may be favored over the elongate flow path 420 as the elongate flow path 410 is longer. The spiral design can maximize length of the elongate flow path 410 in the flow dampener so that better dampening can be achieved. The shape of an elongate flow path is determined by the shape of the elongate groove formed on the corresponding body shell. In other words, an elongate flow path having a particular shape can be obtained by forming the elongate groove in the particular shape.

Figure 5:
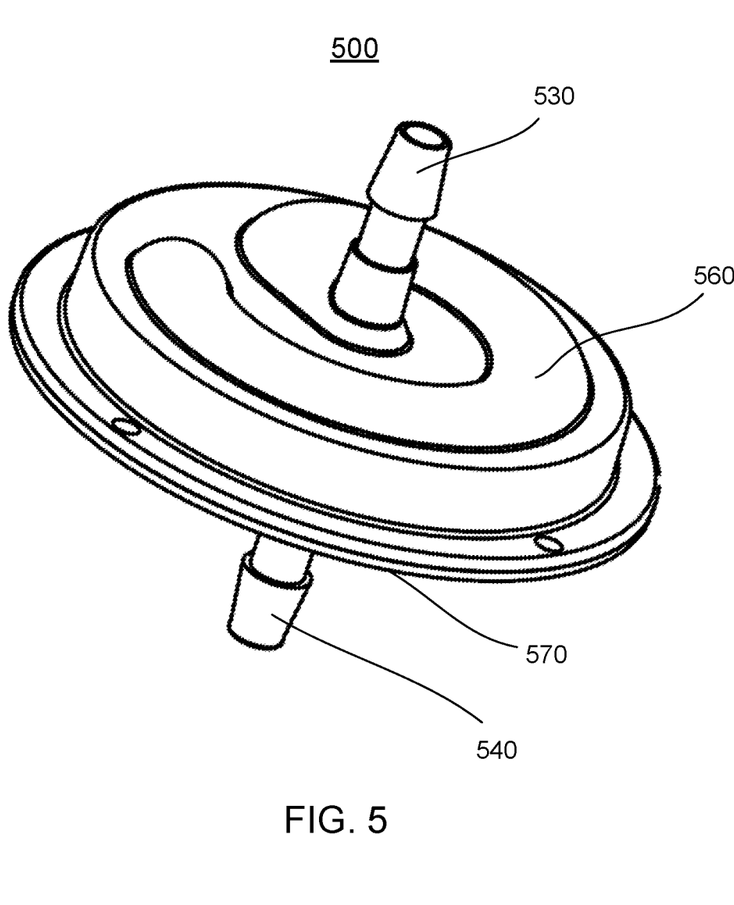
FIG. 5 is a perspective view of another flow dampener, in accordance with an embodiment.

FIG. 5 is a perspective view of another flow dampener 500, in accordance with an embodiment. The flow dampener 500 is an embodiment of the flow dampener 120 in FIG. 1. The flow dampener 500 includes a body shell 560, a flexible membrane 570, and two external flow ports 530 and 540. In other embodiments, the flow dampener 500 can include fewer or more components.

The body shell 560 serves as an outer cover for the flow dampener 500. The body shell has an interior surface. An elongate groove formed on the interior surface. In some embodiments, the body shell 560 is similar to or the same as the body shell 260A, 260B described above in conjunction with FIGS. 2A-2C. The flexible membrane 570 is sealed to the interior surface of the body shell 560 and covers the elongate groove to form an elongate flow path. Flexibility of the flexible membrane 570 dampens pulsation in a flow of fluid through the elongate flow path. In some embodiments, the flexible membrane 570 is similar to or the same as the flexible membrane 270A, 270B described above in conjunction with FIGS. 2A-2C.

The two external flow ports 530 and 540 are connected to the elongate flow path. For instance, the external flow port 530 connects to the center end of the elongate flow path while the external flow port 540 connects to the edge end of the elongate flow path the body shell. The external flow port 530 has a hole through the body shell 560, and the external flow port 540 has a hole through the flexible membrane 570. In some embodiments, the external flow port 530 provides an inlet flow path to the flow dampener 500 and the external flow port 540 provides an outlet flow path to the flow dampener 500. As shown in FIG. 5, the two external flow ports 530 and 540 are mounted on opposite sides of the flow dampener 500. In some embodiments, the flow dampener 500 is oriented vertically, with the external flow port 530 on the top and the external flow port 540 on the bottom to facilitates drainage of the fluid.

Figure 6:
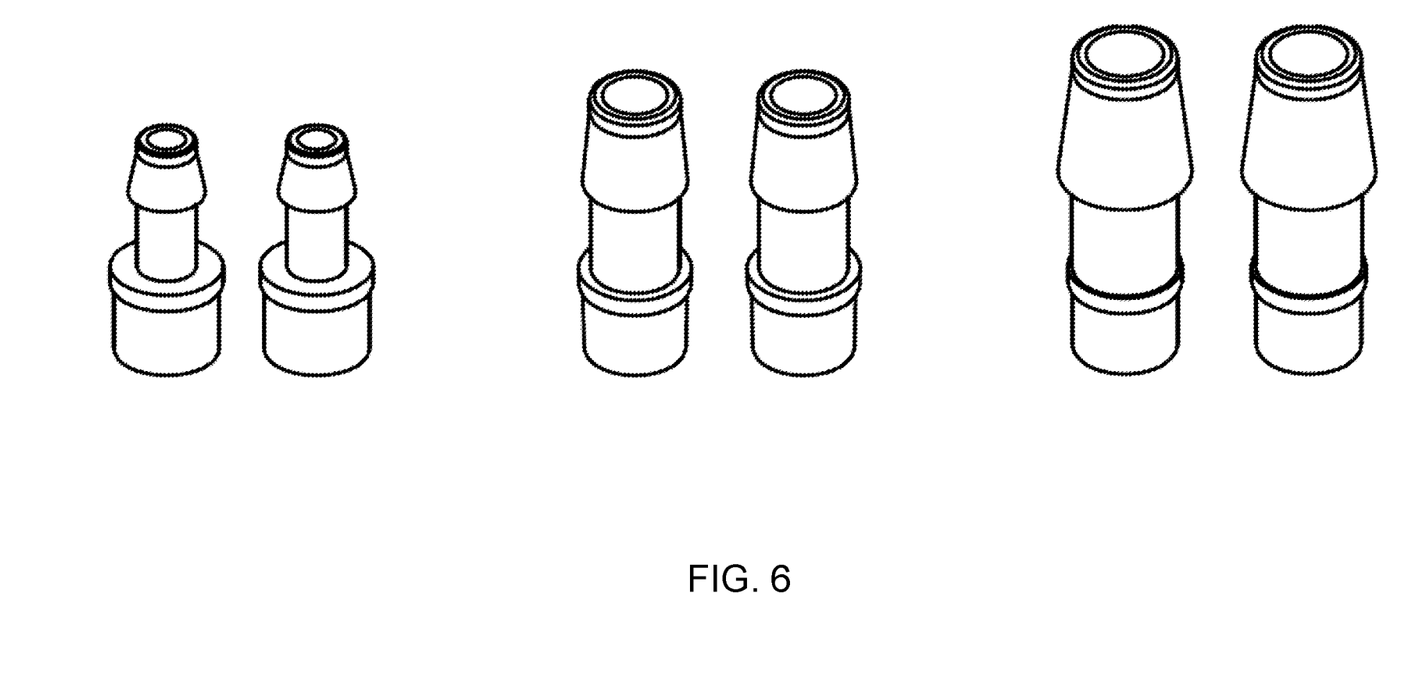
FIG. 6 illustrates example barbed tubing adapters for flow ports of flow dampeners, in accordance with an embodiment.

FIG. 6 illustrates example barbed tubing adapters for flow ports of flow dampeners, in accordance with an embodiment. FIG. 6 shows six barbed tubing adapters, each of which has a different size. In some embodiments, the inner diameters of the barbed tubing adapters are in a range from 1/16 inch to 2 inch. A barbed tubing adapter may be bonded onto the inner surface of an external flow port through sonic welding, a tri clamp, glue (e.g., FDA approved Class VI epoxy), or other methods. In some embodiments, the barbed tubing adapters are fittings, such as hose barbed fittings, tri-clamp fittings, and/or 1/4-28 fittings.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A flow dampener comprising:
   two sections, each section comprising:
      an interior surface with an elongate groove formed on the interior surface; and
      a flexible membrane sealed to the interior surface and covering the elongate groove, the flexible membrane cooperating with the elongate groove to form an elongate flow path, the elongate flow path having two ends, wherein the flexible membrane seals the elongate flow path along its entire length between the two ends and flexibility of the membrane dampens vibration in a flow of fluid through the elongate flow path;
   two external flow ports, one external flow port to one end of the elongate flow path in each section; and
   a through flow port providing a flow path between the other ends of the elongate flow paths.

2. The flow dampener of claim 1, wherein the body shells of the two sections are fastened to each other.

3. The flow dampener of claim 1, wherein each of the two external flow ports comprises a hole through the body shell of one section, and the through flow port comprises a hole through the flexible membrane of each section.

4. The flow dampener of claim 1, wherein the body shells of at least one section is made from a material selected from a group consisting of: a thermoplastic material, thermoset material, and metal.

5. The flow dampener of claim 1, wherein the flexible membrane of at least one section is made from a material selected from a group consisting of: thermoplastic polyurethane, thermoplastic elastomers, polyvinyl chloride, polytetrafluoroethylene (PTFE), modified PTFE, perfluoroalkoxy alkanes (PFA), and silicone.

6. The flow dampener of claim 1, wherein the flexible membrane of at least one section is over-molded onto the body shell of the section.

7. The flow dampener of claim 1, wherein the flexible membrane of at least one section has a thickness in a range from 0.5 mm to 6 mm.

8. The flow dampener of claim 1, wherein flow paths through the two external flow ports are collinear.

9. The flow dampener of claim 1, wherein the elongate flow paths in the two sections are counter-rotational.

10. The flow dampener of claim 1, wherein the flexible membrane of one of the two sections is softer than the flexible membrane of the other section.

11. The flow dampener of claim 1, wherein the flow dampener is disposable.

12. A flow dampener comprising:
   an interior surface with an elongate groove formed on the interior surface;
   a flexible membrane sealed to the interior surface and covering the elongate groove, the flexible membrane cooperating with the elongate groove to form an elongate flow path having two ends, wherein the flexible membrane seals the elongate flow path along its entire length between the two ends and the flexibility of the membrane dampens pulsation in a flow of fluid through the elongate flow path; and
   two flow ports connected to the two ends of the elongate flow path, each of the two.

13. The flow dampener of claim 12, wherein the two flow ports are mounted on opposite sides of the flow dampener.

14. The flow dampener of claim 12, further comprising: a body shell having the interior surface, wherein the body shell serves as an outer cover for the flow dampener.

15. The flow dampener of claim 12, wherein the flexible membrane has a thickness in a range from 0.5 mm to 6 mm.

16. The flow dampener of claim 12, further comprising: a body shell having the interior surface, wherein the flexible membrane is over-molded onto the body shell.

17. A flow dampener comprising:
   a body shell having an interior surface and an elongate groove formed on the interior surface;
   a flexible membrane sealed to the interior surface of the body shell and covering the elongate groove, the flexible membrane cooperating with the elongate groove to form an elongate flow path, wherein flexibility of the membrane dampens pulsation in a flow of fluid through the elongate flow path; and
   two flow ports to the elongate flow path, each of the two flow ports connected to one end of the elongate flow path; wherein the two flow ports are mounted on opposite sides of the flow dampener, one of the flow ports comprises a hole through the body shell, and the other flow port comprises a hole through the flexible membrane.

* * * * *